(12) United States Patent
Ikeda et al.

(10) Patent No.: US 8,431,109 B2
(45) Date of Patent: Apr. 30, 2013

(54) PROCESS FOR PRODUCTION OF COMPOSITION

(75) Inventors: Yoshiaki Ikeda, Iwaki (JP); Masami Kuwai, Iwaki (JP); Shinji Ogama, Iwaki (JP); Yukihiro Kuniyoshi, Sakai (JP); Kazuhisa Hidaka, Sakai (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 11/884,393

(22) PCT Filed: Feb. 25, 2005

(86) PCT No.: PCT/JP2005/003709
§ 371 (c)(1),
(2), (4) Date: Aug. 15, 2007

(87) PCT Pub. No.: WO2006/090488
PCT Pub. Date: Aug. 31, 2006

(65) Prior Publication Data
US 2008/0260624 A1    Oct. 23, 2008

(51) Int. Cl.
*C01G 23/00*    (2006.01)

(52) U.S. Cl.
USPC ........... 423/598; 423/593; 501/134; 501/135; 501/136; 501/137

(58) Field of Classification Search .................. 423/598; 501/139
See application file for complete search history.

(56) References Cited

U.S. PATENT DOCUMENTS 2,193,563 A    3/1940    McKinney et al.
2,758,911 A    8/1956    Lynd et al.
(Continued)

FOREIGN PATENT DOCUMENTS

| CN | 1552628 | 12/2004 |
|---|---|---|
| JP | 67-191232 A | 11/1982 |

(Continued)

OTHER PUBLICATIONS

International Search Report of PCT/JP2005/003709, dated Jun. 14, 2005.
Sasaki. "Method and Process for Producing Barium Titanate and Its Composite Particle." Journal of the Society of Power Technology, vol. 34(11), 1997, pp. 862-874.

(Continued)

*Primary Examiner* — Melvin C Mayes
*Assistant Examiner* — Colette Nguyen
(74) *Attorney, Agent, or Firm* — Hamre, Schumann, Mueller & Larson, P.C.

(57)    ABSTRACT

The invention provides a process for production of a composition comprising a perovskite structure compound, the process comprising: a first process to heat a hydrous oxide of at least one B group element selected from the group consisting of Ti, Zr, Hf, and Sn at a temperature within a range of 80 to 300° C. in the presence of an aqueous medium so as to dehydrate the hydrous oxide; and a second process to heat a reaction product obtained in the first process and a hydroxide of at least one A group element selected from the group consisting of Ba, Sr, Ca, Mg and Pb at a temperature within a range of 100 to 300° C. in the presence of an aqueous medium.

The process provides a composition comprising an $ABO_3$ compound in the form of uniform and fine spherical particles which have an average particle diameter of 1 μm or less, preferably within a range of 0.01 to 0.5 μm, high crystallinity, and a controlled A/B ratio as desired, as well as few internal pores in the crystalline particles.

6 Claims, 9 Drawing Sheets

U.S. PATENT DOCUMENTS

| | | | | |
|---|---|---|---|---|
| 4,643,984 A | * | 2/1987 | Abe et al. | 501/134 |
| 4,829,033 A | * | 5/1989 | Menashi et al. | 501/139 |
| 4,832,939 A | * | 5/1989 | Menashi et al. | 423/598 |
| 4,898,843 A | * | 2/1990 | Matushita et al. | 501/136 |
| 5,087,437 A | | 2/1992 | Bruno et al. | |

FOREIGN PATENT DOCUMENTS

| | | | |
|---|---|---|---|
| JP | 59-39726 A | | 3/1984 |
| JP | 61-31345 A | | 2/1986 |
| JP | 05-178617 | * | 12/1991 |
| JP | 8-73219 A | | 3/1996 |
| JP | 8-119745 A | | 5/1996 |

OTHER PUBLICATIONS

Kubo. "Wet Synthesis of Barium Titanate ($BaTiO_2$)." Journal of the Chemical Society of Japan, vol. 71(11), 1968, pp. 114-118.

Hennings et al. "Defect Chemistry and Microstructure of Hydrothermal Barium Titanate." Journal of the American Ceramic Society, vol. 84(1), 2001, pp, 179-182.

First Office Action issued in corresponding Chinese Office Action mailed Aug. 7, 2009, State Intellectual Property Office, P.R. China, with a partial English translation—10 pages.

\* cited by examiner

PROCESS FOR PRODUCTION OF COMPOSITION

FIELD OF THE INVENTION

The present invention relates to a process for production of a composition comprising a perovskite structure compound (which is referred to as an $ABO_3$ compound hereinafter) in the form of uniform spherical particles which have an average particle diameter of 1 μm or less, preferably within a range of 0.01 to 0.5 μm, high crystallinity, and a controlled A/B ratio as desired, as well as few internal pores in the particles. The $ABO_3$ compound obtained by the invention provides an excellent sintered body of $ABO_3$ compound which has not been conventionally proposed, e.g., a thin layered sintered body of barium titanate having no faults.

BACKGROUND ART

The $ABO_3$ compound is a general name of a compound having a crystal structure similar to that of calcium titanate ore (i.e., perovskite). The compound, when it is molded and then sintered, provides a ceramic having excellent dielectricity, piezoelectricity, and semiconductivity (which ceramic is referred to as a dielectric ceramic hereinafter). The sintered body is in wide use today for electric devices such as a communication device and a computer as a capacitor, a filter, an ignition element, a thermistor, or the like.

In recent years, an electric device has been more miniaturized and improved in performance. Accordingly, parts of an electric device have been also required to be miniaturized and improved in performance, and thus processes for production of dielectric ceramic, e.g., a blending technique, a molding technique, and a sintering technique, among others, have been various improved. However, such improvement in the processes for production has mostly reached to a limit, and thus it is necessary to improve raw materials in order to obtain a more excellent dielectric ceramic. That is, an $ABO_3$ compound having an average particle diameter of 1 μm or less, preferably 0.5 μm or less, a uniform spherical shape, and excellent dispersibility is required.

The reason why such an $ABO_3$ compound is required is as follows. That is, if the compound has a small particle diameter, it will have increased surface energy. If the compound is spherical and has uniform particle size distribution, it will have increased packing property. Therefore, such an $ABO_3$ compound will have remarkably improved sinterability, so that it will be able to provide a dielectric ceramic densely strengthened by sintering at lower temperature. Furthermore, in order to realize a laminated ceramic capacitor having a thinner and more layered structure, a ceramic green sheet having a thickness of 5 μm or less is required. In this case, an $ABO_3$ compound having an average particle diameter of 1 μm or less, preferably within a range of 0.01 to 0.5 μm, a uniform spherical shape, and excellent dispersibility is also required.

According to "Method and Process for Producing Barium Titanate and Its Composite Particle", Kyoichi Sasaki, Journal of the Society of Powder Technology (Japan), The Society of Powder Technology (Japan), 1997, Vol. 34, No. 11, pp. 862-874, an $ABO_3$ compound represented by barium titanate has been conventionally produced by a solid phase method comprising steps of mixing barium carbonate and titanium oxide, calcining the mixture at 1000° C. or more, and wet pulverizing the resulting product, filtering, drying, and classifying the same. In such a solid phase method, it is necessary to calcine the mixture for a long time at a high temperature in order to complete solid phase reaction of barium carbonate and titanium oxide. However, if the mixture is calcined for a long time at a high temperature, growth of particles cannot be avoided during the calcination. As a result, it is difficult to control a particle diameter of the resulting barium titanate particle to be 1 μm or less. Further, when the resulting barium titanate particles are provided for various applications, the particles are sintered to form a sintered body and then pulverized. The resulting particles have no uniform size distribution, and also the shape is not proper to be dispersed.

In order to solve the above-described problems, a wet process for production of barium titanate has been proposed. As the wet process, there may be mentioned an alkoxide method, a coprecipitation method, an oxalate method, and a hydrothermal synthesis. However, every method has its own important problems.

For example, U.S. Pat. No. 5,087,437 discloses an alkoxide method in which barium titanate is obtained by mixing barium alkoxide and titanium alkoxide, and hydrolyzing the mixture, or alternatively, reacting titanium alkoxide with barium hydroxide. However, the alkoxides to be used are costly, and the resulting by-produced alcohol needs to be recovered. Thus, the method is not suitable for industrial application.

On the other hand, the coprecipitation method uses a low-priced raw material, and yet the method provides barium titanate powder excellent in sinterability. For example, JP 59-39726A discloses an example of the coprecipitation method in which barium titanate can be obtained by heating and reacting a water-soluble barium salt and a hydrolysis product of titanium compound in the presence of a strong alkali. However, in this method, even when the obtained reaction product is washed, an alkali used in the reaction is hardly removed. Thus, there is a problem that the alkali inevitably gets mixed in the obtained barium titanate powder.

According to the oxalate method, barium titanate can be obtained by reacting titanium tetrachloride, barium chloride and oxalic acid in water to prepare barium titanyl oxalate, and thermally decomposing the oxalate, as described in, for example, U.S. Pat. No. 2,758,911. Since high purity titanium tetrachloride and barium chloride to be used as raw materials are easily available, high purity barium titanate can be easily obtained by the method. However, precipitate of barium titanyl oxalate obtained by the method is composed of large aggregate and the skeleton of the aggregate is remained at the time of calcination. Thus, the method is apt to produce coarse particles. Further, when the obtained barium titanate powder is sintered to form barium titanate ceramic, there is a problem that the resulting ceramic has large dielectric loss.

Further, there has been known a hydrothermal synthesis as a production method of barium titanate in which a mixture of barium hydroxide and a hydroxide or oxide of titanium is subjected to hydrothermal treatment. The method provides fine and uniform barium titanate having particularly excellent dispersibility. Thus, it has been known that barium titanate obtained by the hydrothermal synthesis can be preferably usable for preparing a laminated ceramic capacitor having a thinner and more layered structure.

For example, U.S. Pat. No. 2,193,563 and "Wet Synthesis of Barium Titanate ($BaTiO_3$)", Kiichiro Kubo, "Journal of the Chemical Society of Japan", 1968, Vol. 71, No. 1, pp. 114-118, describe hydrothermal synthesis to produce barium titanate.

However, in a hydrothermal synthesis, since the reaction of barium hydroxide and a hydroxide or oxide of titanium does not proceed to completion, unreacted titanium components get mixed as solid with barium titanate obtained by the reaction while unreacted barium hydroxide remains dissolved in the reaction mixture. Therefore, when the reaction mixture is filtered and washed with water to separate the obtained barium titanate as solid from the reaction mixture, the water-soluble barium components are removed from the obtained barium titanate. Thus, the obtained barium titanate excessively contains titanium components. Therefore, even if such barium titanate powder is sintered, only a sintered body excessively containing titanium components is obtained. Further, when barium titanate is produced by hydrothermal synthesis, reaction rates of raw materials are slightly varied for every reaction. Thus, since the reaction rates cannot be strictly controlled so that the resulting barium titanate has a predetermined Ba/Ti ratio for use as an electric material, the barium titanate produced by hydrothermal synthesis is not suitable for use as a material of a dielectric ceramic.

In order to solve the above-described problems involved in hydrothermal synthesis of an $ABO_3$ compound, JP 61-31345A has proposed a method in which an A group element dissolved in an aqueous medium is made to be insoluble after hydrothermal reaction to control an A/B ratio of $ABO_3$ compound obtained. This method has been practically used as a method from production of material for a dielectric ceramic.

The problem how to control an A/B ratio in a production of an $ABO_3$ compound by hydrothermal synthesis has been solved in this way. However, barium titanate produced by hydrothermal synthesis has a new problem that hydroxyl groups are included in oxygen lattices of particles. That is, for example, according to "Defective Chemistry and Minute Structure of Barium Titanate by Hydrothermal Synthesis", D. F. K Henning et al., J. Am. Ceram. Soc., 2001, Vol. 84, No. 1, pp. 179-182, when such barium titanate is heated at a temperature of 100 to 600° C., dehydration reaction takes place to produce pores having a nano meter (nm) size in particles. When such barium titanate is formed to a thin layered sintered body, the pores in the barium titanate particles cause crack or delamination, thereby preventing a laminated ceramic capacitor to have a thinner and more layered structure. Therefore, this problem has been required to be solved.

As mentioned above, there is a problem that a conventional $ABO_3$ compound represented by barium titanate cannot fully meets the requirements to miniaturize electric parts of a capacitor, a filter, a thermistor, and the like, and to improve the performance of those. Further, in the hydrothermal synthesis which has been known as an excellent method for production to provide uniform and fine spherical particles having excellent dispersibility, pores having a nano meter size are formed in particles by dehydration at the time of heating. When barium titanate having pores in particles is used to produce a laminated ceramic capacitor, crack or delamination is undesirably caused.

The invention has been completed to solve the above-described problems in the production of an $ABO_3$ compound represented by barium titanate. Therefore, it is an object of the invention to provide a process for production of a composition comprising an $ABO_3$ compound by an improved hydrothermal synthesis, wherein the composition obtained is in the form of uniform spherical particles which have an average particle diameter of 1 μm or less, preferably within a range of 0.01 to 0.5 μm, high crystallinity, and a controlled A/B ratio as desired, as well as few internal pores having a nano meter (nm) size in the crystalline particles. The $ABO_3$ compound having few pores in the crystalline particles can be advantageously used to produce a laminated ceramic capacitor.

DISCLOSURE OF THE INVENTION

The invention provides a process for production of a composition comprising a perovskite structure compound, the process comprising:

a first process to heat a hydrous oxide of at least one B group element selected from the group consisting of Ti, Zr, Hf, and Sn at a temperature within a range of 80 to 300° C. in the presence of an aqueous medium so as to dehydrate the hydrous oxide; and a second process to heat a reaction product obtained in the first process and a hydroxide of at least one A group element selected from the group consisting of Ba, Sr, Ca, Mg and Pb at a temperature within a range of 100 to 300° C. in the presence of an aqueous medium.

BEST MODE FOR CARRYING OUT THE INVENTION

Figure 1:
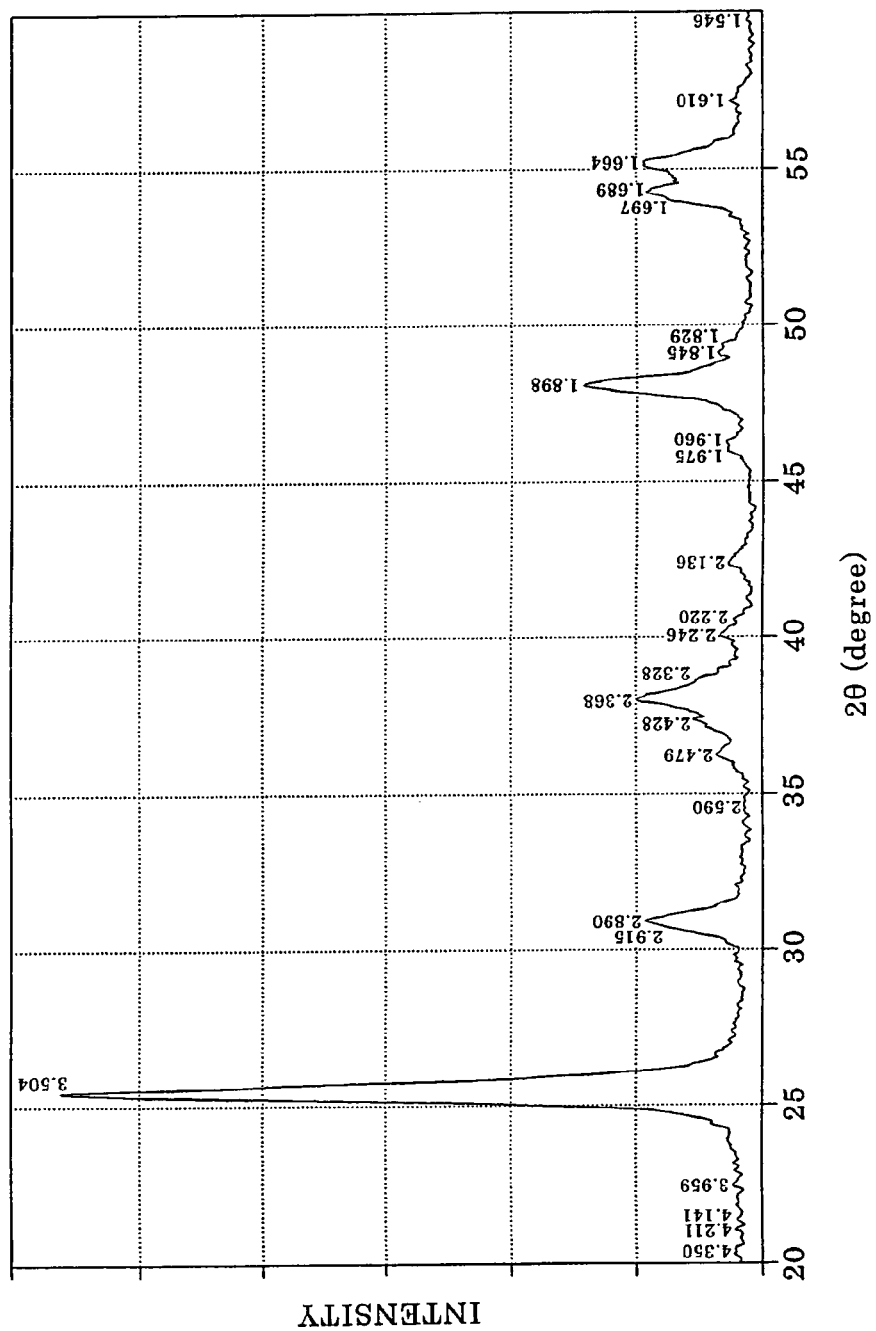
FIG. 1 is an X-ray diffraction pattern of titanium oxide obtained in the first process in Example 3.

In the process for production of a composition comprising a perovskite structure compound according to the invention, the first process is to heat a hydrous oxide of at least one B group element selected from Ti, Zr, Hf, and Sn at a temperature within a range of 80 to 300° C. in the presence of an aqueous medium, preferably water, to dehydrate the hydrous oxide, thereby obtaining a reaction product having higher crystallinity as fine particles The reaction product mainly comprises a corresponding oxide of a B group element.

The hydrous oxide of a B group element is generally an amorphous solid. However, when the solid is heated and dehydrated, an oxide having higher crystallinity can be obtained as fine particles. That is, in general, when the hydrous oxide of a B group element is heated and dehydrated, a reaction product mainly comprising an oxide generally having a primary particle size within a range of 0.005 to 0.4 μm, preferably 0.01 to 0.2 μm, can be obtained.

In the first process, the temperature at which the hydrous oxide of a B group element is heated in the presence of an aqueous medium is within a range of 80 to 300° C. The hydrous oxide can be heated at a temperature within a range from 80° C. to the boiling temperature (about 100° C.) of the aqueous medium used under an atmospheric pressure. In a hydrothermal reaction, the hydrous oxide can be heated within a range of about 100° C. to a critical temperature of the aqueous medium used.

In the invention, when the temperature at which the hydrous oxide of a B group element is heated in the presence of an aqueous medium is less than 80° C., a dehydrating reaction hardly proceeds. On the other hand, as the temperature is higher, the dehydrating reaction proceeds more easily, as is preferred, and further, a particle size diameter of the resulting reaction product tends to be larger. However, when the temperature is more than 300° C., silver or the like must be used as a material of a reactor, so that there is a practical problem from the standpoint of reactors. Particularly, in the invention, the temperature at which the hydrous oxide of a B group element is heated in the presence of an aqueous medium is preferably within a range of 100 to 300° C.

Further, according to the invention, when the hydrous oxide of a B group element is heated in the presence of an aqueous medium in the first process, the hydrous oxide of a B group element can be heated in the presence of an acid or a base in order to promote the dehydrating reaction of the B group element and make the resulting reaction product to be finer. Here, an inorganic acid or an organic acid may be used as the acid and, more particularly, hydrochloric acid or nitric acid is preferably used as the inorganic acid. Further, an organic polybasic carboxylic acid or an organic oxypolybasic carboxylic acid may be used as the organic acid, and those having 2-6 carbons may be preferably used. More particularly, for example, oxalic acid, tartaric acid or citric acid may be used. Furthermore, alkaline metal salt or alkaline earth metal salt of an organic polybasic carboxylic acid or an organic oxypolybasic carboxylic acid may be preferably used.

On the other hand, the base includes an inorganic base, for example, lithium hydroxide, sodium hydroxide, potassium hydroxide, and the like, and an organic base, for example, an alkali metal hydroxide, amines, and the like.

As for the hydrous oxide of a B group element to be used as a raw material in the first process, a commercial product may be used as it is, or the hydrous oxide may be prepared by an appropriate method. For example, the hydrous oxide may be prepared by a method in which a base such as alkali is reacted with a salt of a B group element; by a method in which a salt of a B group element is heated in the presence of water to hydrolyze the salt; by a method in which a source to generate ammonia such as urea is added to a salt of a B group element, and the mixture is heated and hydrolyzed; or by a method in which an alkoxide of a B group element is reacted with water. However, the method to prepare the hydrous oxide of a B group element is not specifically limited in the invention.

Then, in the second process according to the invention, the reaction product of a B group element obtained in the first process and a hydroxide of an A group element are heated in the presence of an aqueous medium, preferably water, thereby subjecting them to a hydrothermal reaction. The reaction temperature in the hydrothermal reaction is within a range of from 100° C. to a critical temperature of the aqueous medium used. When the reaction temperature is less than 100° C., the reaction of the A group element with the B group element proceeds only insufficiently. When the temperature is more than 300° C., a special reactor is needed so that there is a problem as described above. Thus, the preferred temperature is within a range of 100 to 300° C.

As for a hydroxide of an A group element in the second process also, a commercial product may be used as it is, or the hydroxide may be prepared by an appropriate method. For example, the hydroxide may be prepared by a method in which a base such as alkali is reacted with a salt of an A group element; by a method in which an oxide of an A group element is reacted with water to hydrolyze the oxide; or by a method in which an alkoxide of an A group element is reacted with water. However, the method to prepare the hydroxide of an A group element is not specifically limited in the invention.

According to the invention, similarly to the first step, the hydrothermal reaction may be conducted in the presence of such an acid or a base as mentioned above in the second step so as to promote crystallization of the resulting $ABO_3$ compound and make the compound finer.

In the second process, the reaction mixture obtained in the hydrothermal reaction contains an $ABO_3$ compound generated and unreacted compounds of a B group element both as solid, while a part or of the whole of the unreacted hydroxide of an A group element remains dissolved in an aqueous medium. Thus, the resulting $ABO_3$ compound has an A/B ratio different from such a ratio that is derived from the materials used. Therefore, in the invention, it is preferable to control an A/B ratio of the finally obtained composition comprising the $ABO_3$ compound so as to have a desired A/B ratio after completing the hydrothermal reaction in the second process, if necessary. Accordingly, when the composition comprising the $ABO_3$ compound having a desired A/B ratio is sintered, a sintered body of the $ABO_3$ compound having a desired A/B ratio can be obtained.

The control of an A/B ratio can be carried out by a conventionally known method. For example, after a hydrothermal reaction, the resulting reaction mixture is filtered and washed with water to remove a compound of an A group element in the reacted mixture dissolved in an aqueous medium, and an A/B ratio of the reaction mixture (solid) is analyzed, and then a compound of an A group element is additionally added to the reaction mixture as an additive to control an A/B ratio so as to have a desired A/B ratio, thereby providing a composition comprising an $ABO_3$ compound having a desired A/B ratio. When such a composition is sintered, a sintered body having a desired A/B ratio can be obtained.

As a compound of an A group element to be added as an additive to the resulting reaction product, a compound which has low solubility to an aqueous medium used, and in addition, which has following characteristics may be used. As a first example of such a compound, there may be mentioned a compound that leaves no material except an A group element in a sintered body if it is thermally decomposed when a composition comprising an $ABO_3$ compound to which the compound has been added is sintered. Examples of such a compound include a carbonate, an organic acid salt, or an oxide. As a second example of such a compound, there may be mentioned such that it leaves a material except an A group element in a sintered body which material does not affect the desired characteristics of the sintered body when it is thermally decomposed upon sintering of a composition comprising an $ABO_3$ compound to which the compound has been added. Examples of such a compound include a silicate.

However, a water-soluble compound of a A group element may also be used as an additive to control an A/B ratio. When such a water-soluble compound of an A group element is used as an additive to control an A/B ratio, a desired amount of the compound is added to the resulting reaction mixture from the hydrothermal reaction, and then the reaction mixture is subjected to evaporation to dryness.

Further, as an additive to control an A/B ratio other than the above-mentioned, an insolubilizing agent may be used to insolubilize unreacted compounds of an A group element dissolved in the resulting reaction mixture. The insolubilizing agent may be a carbonic acid compound, such as carbon dioxide, sodium carbonate, ammonium carbonate, and the like, an alkali metal salt of carboxylic acid, such as lauric acid, myristic acid, palmitic acid, stearic acid, and the like, silicate, an silica/alumina-based inorganic ion exchange resin, and the like.

Such an insolubilizing agent is added to the resulting reaction mixture after the hydrothermal reaction in an amount necessary to insolubilize an A group element dissolved in the reaction mixture, and after the reaction mixture is filtered and washed with water, a composition comprising an $ABO_3$ compound having a desired A/B ratio can be obtained. A sintered body having a desired A/B ratio can be obtained by sintering such the composition.

According to the invention, an A/B ratio of composition comprising an $ABO_3$ compound finally obtained can be accurately adjusted to 1.00 after completing the hydrothermal reaction in the second process, if necessary, or the A/B ratio can be adjusted to any desired ratio.

As described above, the resulting reaction mixture from the hydrothermal reaction contains an $ABO_3$ compound generated and unreacted compounds of a B group element both as solid, while a part or the whole of unreacted hydroxides of an A group element remains dissolved in an aqueous medium. Further, when an A/B ratio is adjusted as described above, various compounds derived from such additives or insolubilizing agents are remained in the $ABO_3$ compound obtained. Therefore, in this sense, the process of the invention provides a composition comprising an $ABO_3$ compound.

According to the invention, a composition comprising an $ABO^3$ compound obtained in the second process may be thermally treated or heated at a temperature within a range of 100 to 1200° C. in a third process, if necessary. Thermal treatment of the composition in this way promotes the reaction of an unreacted A group element with an unreacted B group element in the resulting composition, thereby enhancing crystallinity of the $ABO_3$ compound obtained. Further, if necessary, the obtained $ABO_3$ compound can be grown so as to have a larger particle diameter. When the thermally treated composition is pulverized and sintered, a more densely sintered body can be obtained.

When a sintered body of a composition comprising an $ABO_3$ compound is produced, there are usually used various compounds as an additive to control sinterability of the composition or electrical property of the sintered body. There may be mentioned as examples of such additives, compounds of B, Bi, alkali metals (e.g., Li, K, Na, and the like), rare earth elements (e.g., Y, Dy, Er, Ho, and the like), transition metals (e.g., Mn, Fe, Co, Nb, and the like), Si, Al, and the like. According to the invention, a composition including such additives can be sintered. Such additives can be added after completing either the first process, the second process, or the third process.

INDUSTRIAL APPLICABILITY

The process of the invention comprises heating a hydrous oxide of at least one B group element at a temperature within a range of 80 to 300° C. in the presence of an aqueous medium so as to dehydrate the hydrous oxide; and subjecting the resulting reaction product and a hydroxide of at least one A group element to hydrothermal treatment in the presence of an aqueous medium. Thus, the process of the invention provides a composition comprising an $ABO_3$ compound in the form of uniform spherical particles which have an average particle diameter of 1 μm or less, preferably within a range of 0.01 to 0.5 μm, high crystallinity, and a controlled A/B ratio as desired, as well as few internal pores having a nano meter size in the crystalline particles. For example, the ratio of such particles having pores therein is ten or less to 100 particles. Therefore, the composition obtained is excellent in sinterability, and provides a dielectric ceramic excellent in dielectric, piezoelectricity, and semiconductivity when it is sintered.

EXAMPLES

The invention will be described below by way of examples, but the invention is not specifically limited to the examples. In the followings, the number of particles having pores among the particles of the composition obtained is measured as follows. The obtained particles were photographed with a transmission electron microscope at a magnification of 50000 to 100000 times and then 300 particles were visually observed to count the number of particles having pores, and this number was converted to a number of particles per 100 particles.

Example 1

94.9 g of titanium tetrachloride (0.5 mol as titanium) was added to 1300 mL of ion-exchanged water with stirring while the titanium tetrachloride was kept at a temperature of 50° C. to prepare an aqueous solution of titanium tetrachloride. 800 g of a solution of sodium hydroxide having a concentration of 10.0% by weight was added to the aqueous solution of titanium tetrachloride over 30 minutes to prepare a slurry of titanium hydroxide. The titanium hydroxide was washed with water and collected by filtration. Water was added to the titanium hydroxide to prepare a slurry having a concentration of 2.0 mol/L. The slurry was then reacted at 80° C. for 10 hours with stirring (the first process).

A part of the thus obtained slurry of titanium oxide was sampled and subjected to X-ray diffraction to show that the titanium oxide was a mixture of anatase and brookite titanium oxide. The titanium oxide was found to have an average particle diameter of 0.02 μm by electron microscopic measurement.

The whole amount of the titanium oxide was collected by filtration, and placed in a beaker made of polytetrafluoroethylene. 157.7 g (0.5 mol as Ba) of barium hydroxide octahydrate $(Ba(OH)_2.8H_2O)$ and water were added to the titanium oxide under nitrogen atmosphere to prepare a slurry having a concentration of 1.0 mol/L (in terms of $BaTiO_3$). The beaker containing the slurry was placed in an autoclave having a 1 L capacity. The temperature inside the autoclave was increased up to 150° C. over 90 minutes while stirring at 550 to 600 rpm, and a hydrothermal reaction was carried out at 150° C. for 5 hours After the reaction, carbon dioxide gas was blown into the obtained slurry until it had a pH of 6.5. Thereafter, the slurry was washed with water until chlorine was no longer detected, and then filtered and dried at 110° C. to provide a composition comprising $ABO_3$ compound (which will be simply referred to the composition herein this Example; the second process).

It was confirmed by X-ray diffraction that the composition was barium titanate having a cubic perovskite structure. Further, the composition was subjected to electron microscopic measurement to show that it had an average particle diameter of 0.05 μm, and that the ratio of particles having pores having a nano meter size was 7 per 100 particles. The composition was analyzed by a fluorescent X-ray method to show that the ratio of Ba/Ti was 1.00. The composition was found to have a BET specific surface area of 21 m²/g.

Example 2

An aqueous solution of titanium tetrachloride was prepared and using the solution, a slurry of titanium hydroxide was prepared in the same manner as Example 1. The resulting titanium hydroxide was collected by filtration and washed with water to prepare a slurry having a concentration of 1.5 mol/L. The whole amount of the slurry was placed in a beaker made of polytetrafluoroethylene, and was placed in an autoclave having a 1 L capacity. The slurry was then subjected to a hydrothermal reaction at 150° C. for 5 hours while stirring (the first process).

A part of the thus obtained slurry of titanium oxide was sampled and subjected to X-ray diffraction to show that the titanium oxide was a mixture of anatase and brookite titanium oxide. The titanium oxide was found to have an average particle diameter of 0.02 μm by electron microscopic measurement.

315.4 g of barium hydroxide octahydrate ($Ba(OH)_2 \cdot 8H_2O$) and water were added to the slurry of the titanium oxide thus obtained under nitrogen atmosphere to prepare a slurry having a concentration of 1.0 mol/L (in terms of $BaTiO_3$). The slurry was again placed in an autoclave having a 1 L capacity, and the temperature was increased up to 150° C. over 90 minutes while stirring at 550 to 600 rpm, and then a hydrothermal reaction was carried out at 150° C. for 5 hours.

After the reaction, acetic acid was added to the resulting reaction mixture to adjust the pH of the reaction mixture to 5, and then the slurry was washed with water and filtered. The amount of the barium in the whole filtrate obtained was analyzed by an ICP (inductive coupling high-frequency plasma) method to find that the reaction rate of barium was 0.985. The reaction rate is herein defined as ((mol numbers of barium used−mol numbers of barium in the filtrate)/mol numbers of barium used)).

Purified water was added to the reaction product thus collected by filtration to prepare a slurry again. The slurry was washed with water until chlorine was no longer detected, and then 1.48 g of fine barium carbonate produced by Sakai Chemical Industry Co., Ltd. was added to the slurry and fully dispersed therein with a homogenizer. Solid components were collected by filtration, and dried at 110° C. to prepare a composition comprising an $ABO_3$ compound (which is simply referred to as the composition herein this Example; the second process).

It was confirmed by X-ray diffraction that the composition was barium titanate having a cubic perovskite structure similarly to the composition obtained in Example 1. The composition was subjected to electron microscopic measurement to show that it had an average particle diameter of 0.06 μm, and that the ratio of particles having pores having a nano meter size was 8 per 100 particles. The composition was analyzed by a fluorescent X-ray method to show that the ratio of Ba/Ti was 1.00. Further, the composition was found to have a BET specific surface area of 19 $m^2/g$.

Example 3

An aqueous solution of titanium tetrachloride was prepared and using the solution, a slurry of titanium hydroxide was prepared in the same manner as Example 1. The titanium hydroxide was collected by filtration and washed with water. Water was added to the titanium hydroxide to prepare a slurry having a concentration of 1.0 mol/L. The whole amount of the slurry was placed in a beaker made of polytetrafluoroethylene, and 1.19 g of lithium hydroxide (LiOH) was added to the slurry. The slurry was then placed in an autoclave having a 1 L capacity, and was subjected to a hydrothermal reaction at 150° C. for 5 hours while stirring (the first process).

Figure 2:
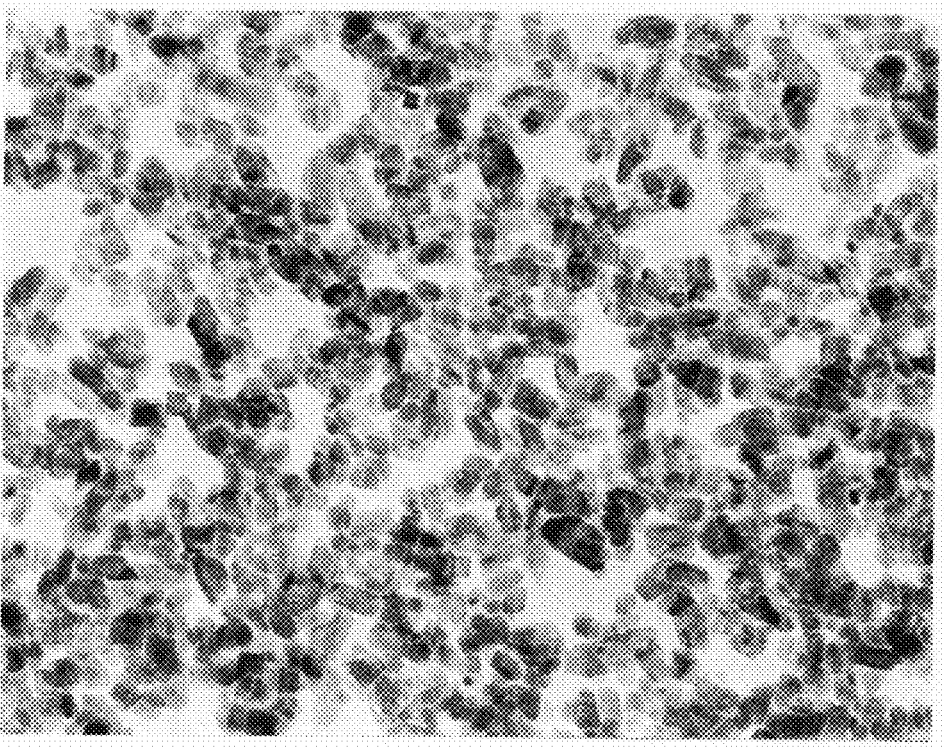
FIG. 2 is a transmission electron microscope photograph of titanium oxide obtained in the first process in Example 3.

A part of the thus obtained slurry of titanium oxide was sampled and subjected to X-ray diffraction to show that the titanium oxide was a mixture of anatase and brookite titanium oxide, as shown in FIG. 1. Further, the titanium oxide was found to have an average particle diameter of 0.03 μm by electron microscopic measurement, as shown in FIG. 2.

315.4 g of barium hydroxide octahydrate and water were added to the slurry of the titanium oxide under nitrogen atmosphere to adjust the concentration of the slurry to 1.0 mol/L (in terms of $BaTiO_3$). The slurry was again placed in an autoclave having a 1 L capacity. The temperature was increased up to 150° C. over 90 minutes while stirring at 550 to 600 rpm, and a hydrothermal reaction was carried out at 150° C. for 5 hours. After the reaction, the obtained slurry was washed with water and filtered. The amount of barium in the whole filtrate obtained was analyzed by an ICP method to find that the reaction rate of barium was 0.980.

Purified water was added to the reaction product collected by filtration as above mentioned to prepare a slurry again, and the slurry was washed with water until chlorine was no longer detected. 1.97 g of fine barium carbonate produced by Sakai Chemical Industry Co., Ltd. was added to the slurry and fully dispersed therein with a homogenizer. Solid components were collected by filtration, and dried at 110° C. to provide a composition comprising an $ABO_3$ compound (which is simply referred to as the composition herein this Example; the second process).

Figure 3:
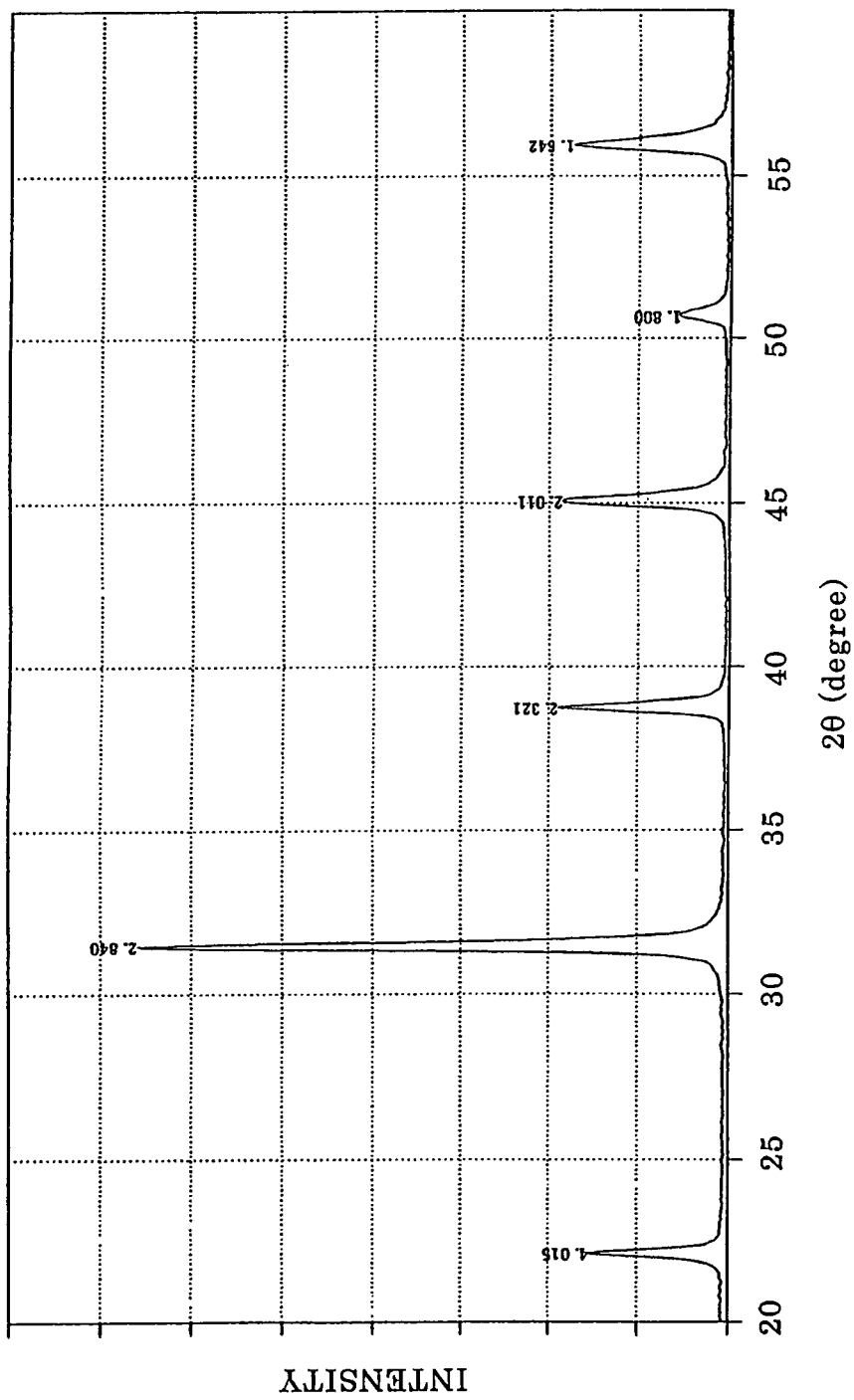
FIG. 3 is an X-ray diffraction pattern of a composition obtained in the second process in Example 3.

It was confirmed by X-ray diffraction that the composition was barium titanate having a cubic perovskite structure, as shown in FIG. 3, similarly to the composition obtained in Example 1. Further, the composition was subjected to electron microscopic measurement to show that it had an average particle diameter of 0.04 μm, and that the ratio of particles having pores having a nano meter size was 5 per 100 particles. The composition was analyzed by a fluorescent X-ray method to show that the ratio of Ba/Ti was 1.00. The composition was found to have a BET specific surface area of 25 $m^2/g$.

Example 4

An aqueous solution of titanium tetrachloride was prepared and using the solution, a slurry of titanium hydroxide was obtained in the same manner as Example 1. The titanium hydroxide was collected by filtration and washed with water, and water was added to the titanium hydroxide to prepare a slurry having a concentration of 1.0 mol/L. The whole amount of the slurry was placed in a beaker made of polytetrafluoroethylene, and 9.60 g of citric acid was added to the slurry. The slurry was then placed in an autoclave having a 1 L capacity, and was subjected to a hydrothermal reaction at 150° C. for 5 hours while stirring (the first process).

A part of the thus obtained slurry of titanium oxide was sampled and subjected to X-ray diffraction to show that the titanium oxide was a mixture of anatase and brookite titanium oxide. Further, the titanium oxide was found to have an average primary particle diameter of 0.02 μm by electron microscopic measurement.

315.5 g of barium hydroxide octahydrate and water were added to the slurry of titanium oxide under nitrogen atmosphere to adjust the concentration of the slurry to 1.0 mol/L (in terms of $BaTiO_3$). The slurry was again placed in an autoclave having a 1 L capacity. The temperature was increased up to 150° C. over 90 minutes while stirring at 550 to 600 rpm, and a hydrothermal reaction was carried out at 150° C. for 5 hours. After the reaction, the obtained slurry was washed with water and filtered. The amount of barium in the whole filtrate obtained was analyzed by an ICP method to find that the reaction rate of barium was 0.997.

Purified water was added to the reaction product collected by filtration as mentioned above to prepare a slurry again, and the slurry was washed with water until chlorine was no longer detected. 2.27 g of fine barium carbonate produced by Sakai Chemical Industry Co., Ltd. was added to the slurry and fully dispersed therein with a homogenizer. Solid components were collected by filtration, and dried at 110° C. to provide a composition comprising an $ABO_3$ compound (which is simply referred to as the composition herein this Example; the second process).

It was confirmed by X-ray diffraction that the composition was barium titanate having a cubic perovskite structure similarly to the composition obtained in Example 1. Further, the composition was subjected to electron microscopic measurement to show that it had an average particle diameter of 0.06 μm, and that the ratio of particles having pores having a nano meter size was 4 per 100 particles. The composition was analyzed by a fluorescent X-ray method to show that the ratio of Ba/Ti was 1.02. Further, the composition was found to have a BET specific surface area of 21 m²/g.

Example 5

142.17 g (0.5 mol as titanium) of titanium isopropoxide was added to 300 mL of isopropyl alcohol under nitrogen atmosphere. 70 mL of ion-exchanged water was added to the resulting solution over 60 minutes while stirring to prepare a slurry of titanium hydroxide. The titanium hydroxide was washed with water and collected by filtration. Water was added to the titanium hydroxide to prepare a slurry having a concentration of 2.0 mol/L. The slurry was then heated at 80° C. for 10 hours while stirring (the first process).

A part of the thus obtained slurry of titanium oxide was sampled and subjected to X-ray diffraction to show that the titanium oxide was anatase titanium oxide. Further, the titanium oxide was found to have an average particle diameter of 0.01 μm by electron microscopic measurement.

The whole amount of the slurry of titanium oxide obtained was filtered, and the obtained titanium oxide was placed in a beaker made of polytetrafluoroethylene. 111.8 g of barium isopropoxide and water were added to the titanium oxide under nitrogen atmosphere to prepare a slurry having a concentration of 1.0 mol/L (in terms of $BaTiO_3$). The slurry was placed in an autoclave having a 1 L capacity. The temperature was increased up to 150° C. over 90 minutes while stirring at 550 to 600 rpm, and a hydrothermal reaction was carried out at 150° C. for 5 hours. After the reaction, carbon dioxide was blown into the obtained slurry until it had a pH of 5.6. Then, the slurry was washed with water until chlorine was no longer detected, and then filtered and dried at 110° C. to provide a composition comprising an $ABO_3$ compound (which will be simply referred to the composition herein this Example; the second process).

The composition thus obtained in the second process was heated at about 1000° C. in an electric furnace and then wet pulverized using zirconia balls in a nylon pot mill to provide a composition comprising an $ABO_3$ compound (which is simply referred to as the composition herein this Example). It was confirmed by X-ray diffraction that the composition was barium titanate having a tetragonal perovskite structure. Further, the composition was subjected to electron microscopic measurement to show that it had an average particle diameter of 0.4 μm, and that the ratio of particles having pores having a nano meter size was 6 per 100 particles. The composition was analyzed by a fluorescent X-ray method to show that the ratio of Ba/Ti was 1.00. Further, the composition was found to have a BET specific surface area of 2.8 m²/g.

Example 6

94.9 g of titanium tetrachloride (0.5 mol as titanium) was added to 1300 mL of ion-exchanged water with stirring while the titanium tetrachloride was kept at a temperature of 50° C. to prepare an aqueous solution of titanium tetrachloride. 0.061 g of manganese nitrate ($Mn(NO_3)_2 \cdot 6H_2O$) was added to the aqueous solution of titanium tetrachloride, and then 800 g of a solution of sodium hydroxide having a concentration of 10.0% by weight was added over 30 minutes to prepare a slurry of titanium hydroxide containing manganese. The slurry of titanium hydroxide containing manganese was washed with water and filtered. Water was added to the titanium hydroxide containing manganese collected by filtration as mentioned above to prepare a slurry having a concentration of 2.0 mol/L. The slurry was reacted at 80° C. for 10 hours with stirring (the first process).

The titanium oxide containing manganese thus obtained was subjected to electron microscopic measurement to show that it had an average particle diameter of 0.02 μm. Then, a composition comprising an $ABO_3$ compound (which is simply referred to as the composition herein this Example) was obtained in the same manner as Example 1.

It was confirmed by X-ray diffraction that the composition was barium titanate having a cubic perovskite structure. Further, the composition was subjected to electron microscopic measurement to find that it had an average particle diameter of 0.05 μm, and that the ratio of particles having pores having a nano meter size was 7 per 100 particles. The amount of manganese in the composition was found to be 0.01% by weight as a result of ICP analysis. The composition was analyzed by a fluorescent X-ray method to show that the ratio of Ba/Ti was 1.00. Further, the composition was found to have a BET specific surface area of 21 m²/g.

Example 7

The composition obtained in Example 1 was calcined at 900° C. in an electric furnace and wet pulverized by a planetary ball mill using ion-exchanged water and zirconia beads to provide a composition comprising an $ABO_3$ composition (which is simply referred to as the composition herein this Example).

Figure 4:
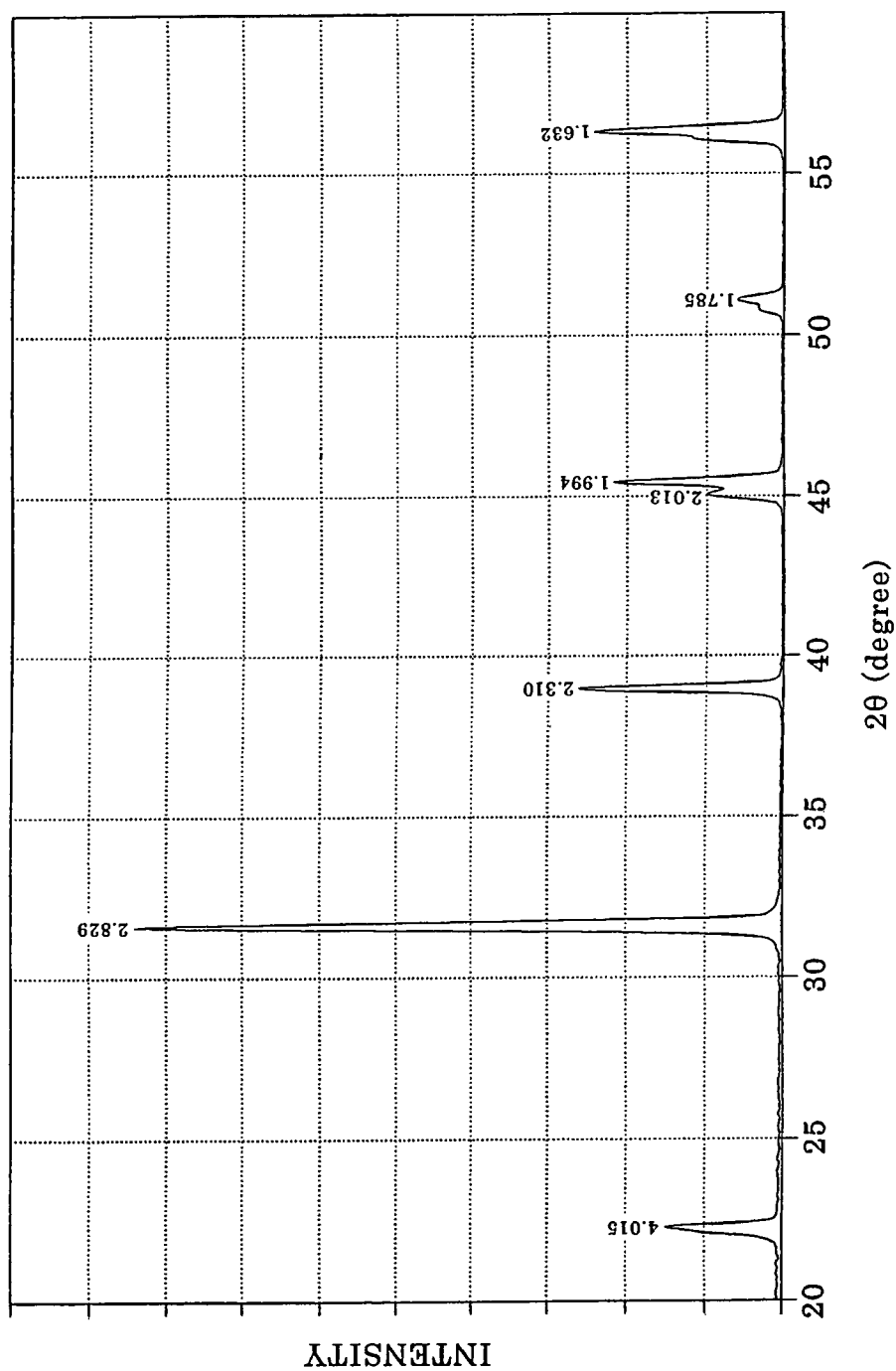
FIG. 4 is an X-ray diffraction pattern of a composition obtained in the third process in Example 7.

It was confirmed by X-ray diffraction that the composition was barium titanate having a tetragonal perovskite structure as shown in FIG. 4. Further, the composition was subjected to electron microscopic measurement to show that it had an average particle diameter of 0.2 μm, and that the ratio of particles having pores having a nano meter size was 7 per 100 particles.

Example 8

An aqueous solution of titanium tetrachloride was prepared in the same manner as Example 1. 503 mL of aqueous solution of ammonia having a concentration of 5.0% by weight was added to the aqueous solution of titanium tetrachloride over 30 minutes to prepare a slurry of titanium hydroxide. The titanium hydroxide was collected by filtration, and washed with water. Water was added to the titanium hydroxide to prepare a slurry having a concentration of 1.5 mol/L. The whole amount of the slurry was placed in a beaker made of polytetrafluoroethylene, and placed in an autoclave having a 1 L capacity to subject the slurry to a hydrothermal reaction at 150° C. for 5 hours while stirring (the first process).

A part of the thus obtained slurry of titanium oxide was sampled and subjected to X-ray diffraction to show that the titanium oxide was anatase titanium oxide. Further, the titanium oxide was found to have an average particle diameter of 0.02 μm by electron microscopic measurement.

265.8 g of strontium hydroxide octahydrate ($Sr(OH)_2 \cdot 8H_2O$) and water were added to the slurry of titanium oxide obtained under nitrogen atmosphere to adjust the concentration of the slurry to 1.0 mol/L (in terms of $SrTiO_3$). Then, a composition comprising an $ABO_3$ compound (which is simply referred to as the composition herein this Example) was obtained in the same manner as Example 2.

Figure 5:
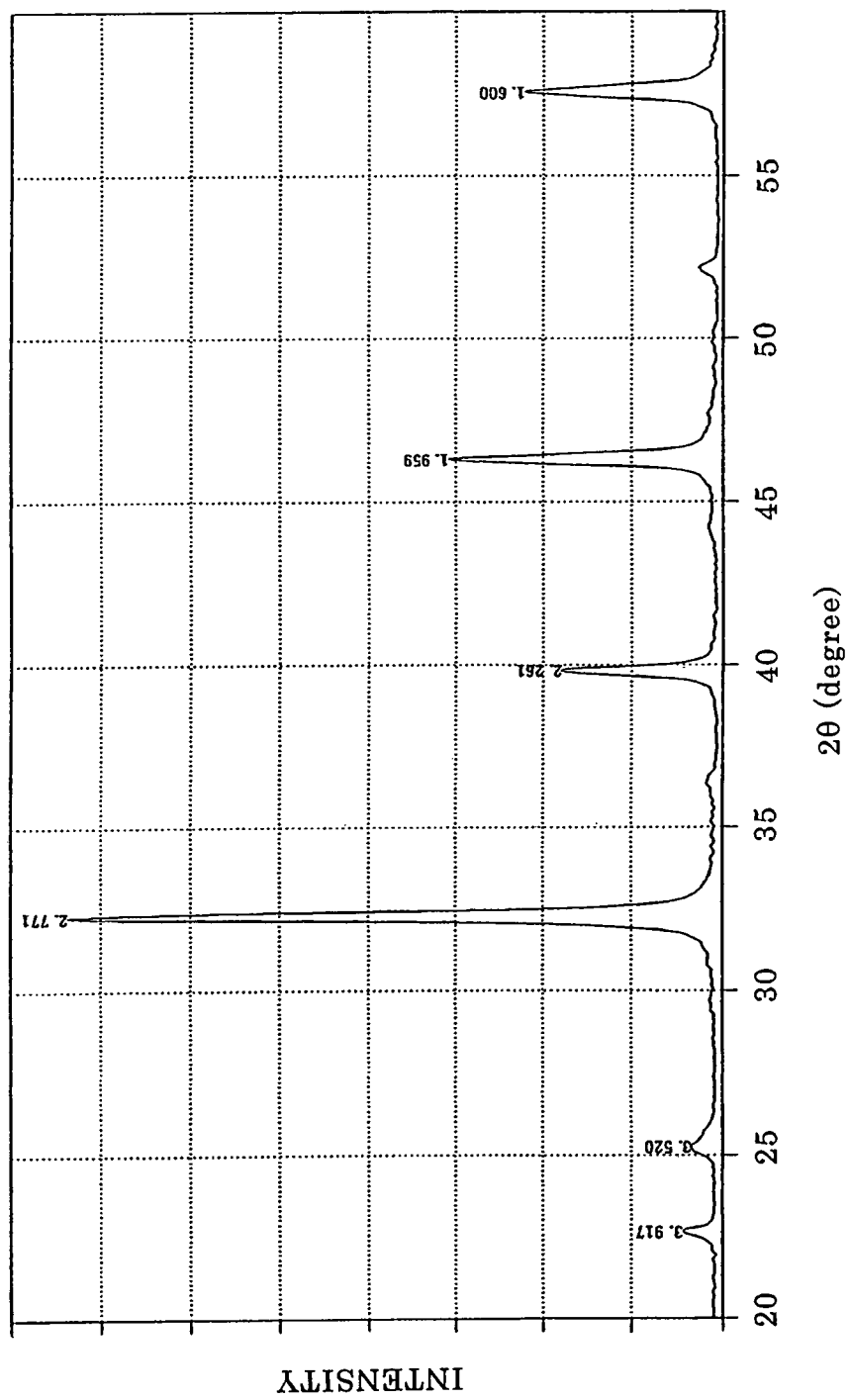
FIG. 5 is an X-ray diffraction pattern of a composition obtained in the second process in Example 8.

It was confirmed by X-ray diffraction that the composition was barium titanate having a cubic perovskite structure as shown in FIG. 5. Further, the composition was subjected to electron microscopic measurement to show that it had an average particle diameter of 0.05 μm, and that the ratio of particles having pores having a nano meter size was 5 per 100 particles. The composition was analyzed by a fluorescent X-ray method to show that the ratio of Sr/Ti was 1.00. Further, the composition was found to have a BET specific surface area of 22 $m^2/g$.

Example 9

An aqueous solution of titanium tetrachloride was prepared in the same manner as Example 1. 197 mL of ion-exchanged water was added to the aqueous solution of titanium tetrachloride, and then 283 g of aqueous solution of urea having a concentration of 30% by weight and kept at 80° C. was added over 100 minutes. After the resulting solution was heated and refluxed for 10 hours, an aqueous solution of ammonia having a concentration of 5% by weight was added to the solution so that it had a pH of 10. The solution was washed with water until chlorine was no longer detected, thereby providing a slurry of titanium hydroxide. Then, using the slurry of titanium hydroxide, a slurry of titanium oxide was prepared in the same manner as Example 8 (the first process). The titanium oxide was found to have an average particle diameter of 0.03 μm by electron microscopic measurement.

240 g of aqueous solution of urea having a concentration of 30% by weight and kept at 80° C. was added to 1104 g (0.5 mol as lead) of aqueous solution of lead nitrate ($Pb(NO_3)_2$) having a concentration of 30% by weight over 200 minutes. After the resulting mixture was heated and refluxed for 10 hours, an aqueous solution of ammonia having a concentration of 5% by weight was added to the mixture so that it had a pH of 10. The mixture was washed with water until chlorine and nitrate ions were no longer detected, thereby providing a slurry of lead hydroxide.

The slurry of lead hydroxide was added to the slurry of titanium oxide. Then, 50 g of aqueous solution of sodium hydroxide having a concentration of 20% by weight and water were added to the resulting slurry to adjust the concentration of the slurry to 1.0 mol/L (in terms of $PbTiO_3$). Then, a composition comprising an $ABO_3$ compound (which is simply referred to as the composition herein this Example) was obtained in the same manner as Example 2.

It was confirmed by X-ray diffraction that the composition was lead titanate having a perovskite structure. Further, the composition was subjected to electron microscopic measurement to show that it had an average particle diameter of 0.05 μm, and that the ratio of particles having pores having a nano meter size was 9 per 100 particles. The composition was analyzed by a fluorescent X-ray method to show that the ratio of Pb/Ti was 1.00. Further, the composition was found to have a BET specific surface area of 17 $m^2/g$.

Example 10

163.78 g (0.5 mol as zirconium) of zirconium isopropoxide was dissolved in 300 mL of isopropyl alcohol under nitrogen atmosphere. 70 mL of ion-exchanged water was added to the resulting solution over 60 minutes with stirring to prepare a slurry of zirconium hydroxide. The zirconium hydroxide was collected by filtration, washed with water, and water was added to the zirconium hydroxide to prepare a slurry having a concentration of 1.5 mol/L. The whole amount of the slurry was placed in a beaker made of polytetrafluoroethylene, and placed in an autoclave having a 1 L capacity to subject the slurry to a hydrothermal reaction at 150° C. for 5 hours while stirring (the first process). The zirconium oxide thus obtained was found to have an average particle diameter of 0.04 μm by electron microscopic measurement.

315.4 g of barium hydroxide octahydrate and water were added to the slurry of zirconium oxide thus obtained under nitrogen atmosphere to prepare a slurry having a concentration of 1.0 mol/L (in terms of $BaZrO_3$). Then, a composition comprising an $ABO_3$ compound (which is simply referred to as the composition herein this Example) was obtained in the same manner as Example 2.

Figure 6:
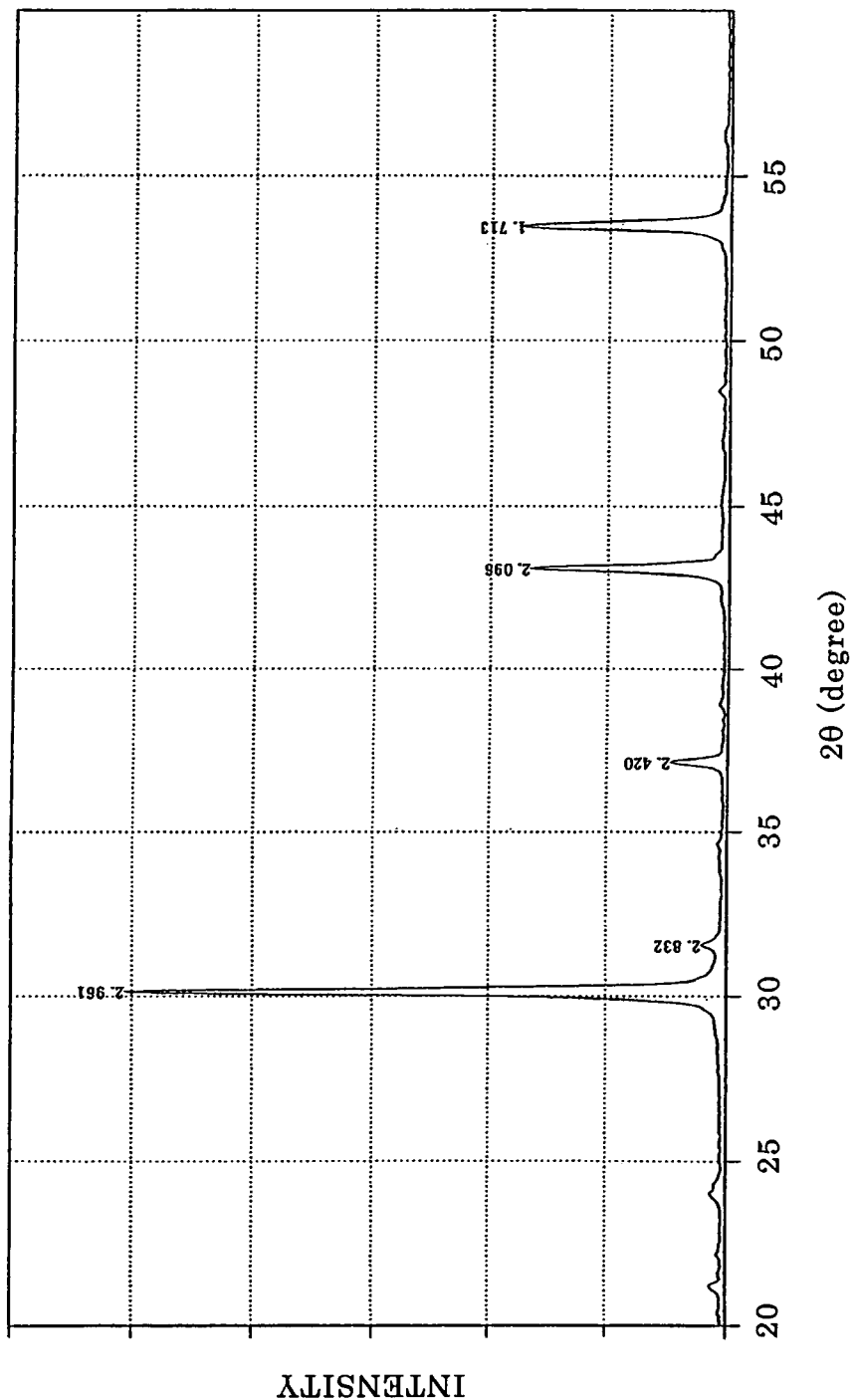
FIG. 6 is an X-ray diffraction pattern of a composition obtained in the second process in Example 10.

It was confirmed by X-ray diffraction that the composition was barium zirconate having a cubic perovskite structure as shown in FIG. 6. Further, the composition was subjected to electron microscopic measurement to show that it had an average particle diameter of 0.08 μm, and that the ratio of particles having pores having a nano meter size was 6 per 100 particles. The composition was analyzed by a fluorescent X-ray method to show that the ratio of Ba/Zr was 1.00. Further, the composition was found to have a BET specific surface area of 15 $m^2/g$.

Example 11

A slurry of titanium hydroxide was prepared in the same manner as Example 1. The thus obtained titanium hydroxide was washed with water and collected by filtration, and then water was added to titanium hydroxide to prepare a slurry having a concentration of 1.5 mol/L. The whole amount of the slurry was placed in a beaker made of polytetrafluoroethylene, and placed in an autoclave having a 1 L capacity. Then the slurry was subjected to a hydrothermal reaction at 150° C. for 5 hours (the first process). The titanium oxide thus obtained was found to have an average particle diameter of 0.02 μm by electron microscopic measurement.

56.1 g of calcium oxide (CaO) and water were added to the slurry of titanium oxide under nitrogen atmosphere to prepare a slurry having a concentration of 1.0 mol/L (in terms of $CaTiO_3$). Then, a composition comprising an $ABO_3$ compound (which is simply referred to as the composition herein this Example) was obtained in the same manner as Example 2.

Figure 7:
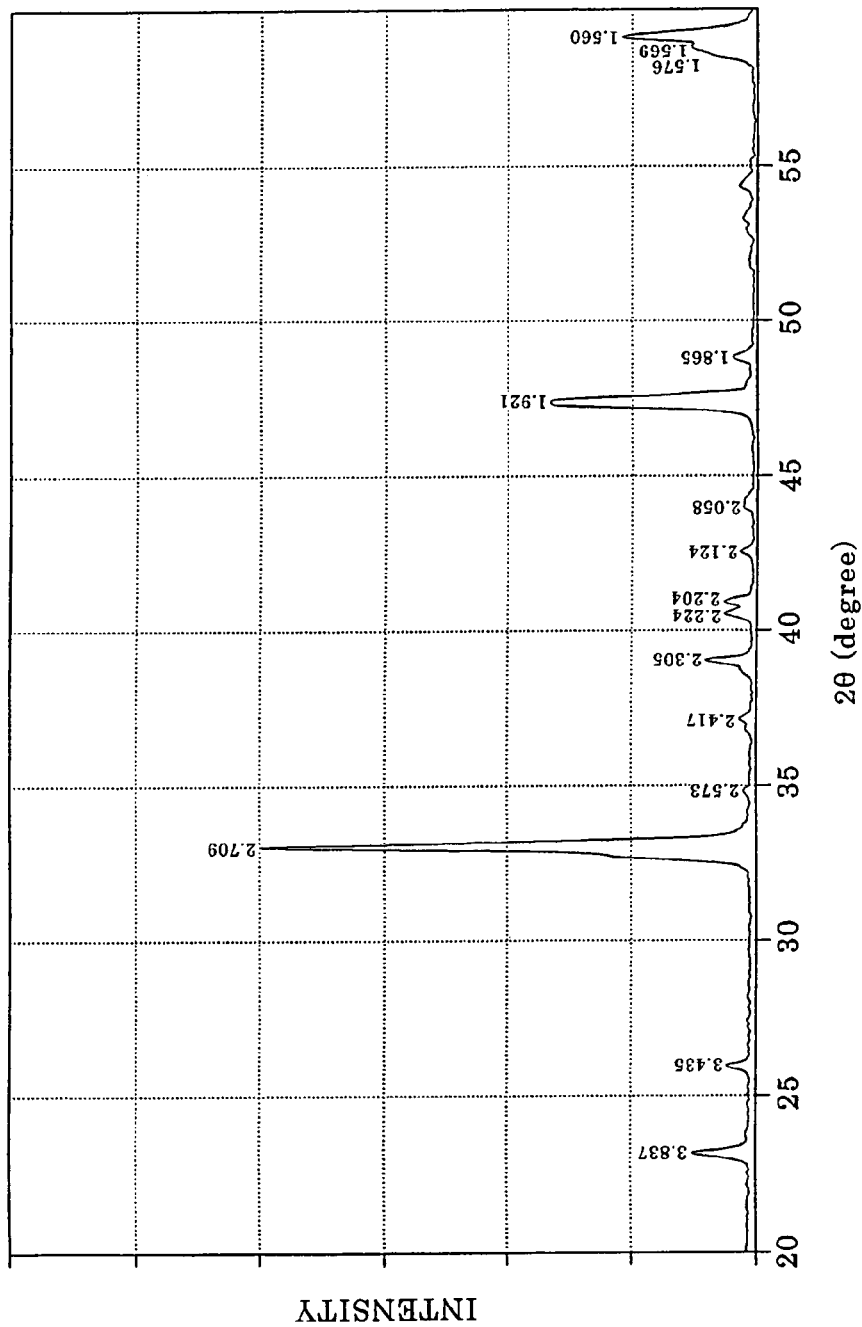
FIG. 7 is an X-ray diffraction pattern of a composition obtained in the second process in Example 11.

It was confirmed by X-ray diffraction that the composition was calcium titanate having an orthorhombic perovskite structure as shown in FIG. 7. Further, the composition was subjected to electron microscopic measurement to show that it had an average particle diameter of 0.06 μm, and that the ratio of particles having pores having a nano meter size was 8 per 100 particles. The composition was analyzed by a fluorescent X-ray method to show that the ratio of Ca/Ti was 1.00. Further, the composition was found to have a BET specific surface area of 21 $m^2/g$.

Example 12

A slurry of zirconium oxide was prepared using zirconium isopropoxide in the same manner as Example 10 (the first process). 265.8 g of strontium hydroxide ($Sr(OH)_2.8H_2O$) and water were added to the slurry of zirconium oxide under nitrogen atmosphere to adjust the concentration of the slurry to 1.0 mol/L (in terms of SrZrO$_3$). Then, a composition comprising an ABO$_3$ compound (which is simply referred to as the composition herein this Example) was obtained in the same manner as Example 2.

It was confirmed by X-ray diffraction that the composition was strontium zirconate having a perovskite structure. The composition was subjected to electron microscopic measurement to show that it had an average particle diameter of 0.07 μm, and that the ratio of particles having pores having a nano meter size was 8 per 100 particles. The composition was analyzed by a fluorescent X-ray method to show that the ratio of Sr/Zr was 1.00. The composition was found to have a BET specific surface area of 16 m$^2$/g.

Example 13

75.9 g of titanium tetrachloride (0.4 mol as titanium) was added to 1300 mL of ion-exchanged water with stirring while the titanium tetrachloride was kept at a temperature of 50° C., and then 100 mL of aqueous solution of zirconium oxychloride having a concentration of 178 g/L (0.1 mol as zirconium) was added thereto, thereby preparing an aqueous mixed solution of titanium tetrachloride and zirconium oxychloride. 800 g of aqueous solution of sodium hydroxide having a concentration of 10.0% by weight was added to the aqueous mixed solution of titanium tetrachloride and zirconium oxychloride over 30 minutes to prepare a slurry of titanium zirconium hydroxide coprecipitate.

The titanium zirconium hydroxide coprecipitate was washed with water and collected by filtration, and water was added thereto to prepare a slurry having a concentration of 1.5 mol/L. The whole amount of the slurry was placed in a beaker made of polytetrafluorethylene, and placed in an autoclave having a 1 L capacity to subject the slurry to a hydrothermal reaction at 150° C. for 5 hours (the first process). The titanium zirconium oxide thus obtained was found to have an average particle diameter of 0.03 μm by electron microscopic measurement.

315.4 g of barium hydroxide octahydrate and water were added to the slurry of titanium zirconium oxide under nitrogen atmosphere to prepare a slurry having a concentration of 1.0 mol/L (in terms of BaTi$_{0.8}$Zr$_{0.2}$O$_3$). Then, a composition comprising an ABO$_3$ compound (which is simply referred to as the composition herein this Example) was obtained in the same manner as Example 2.

Figure 8:
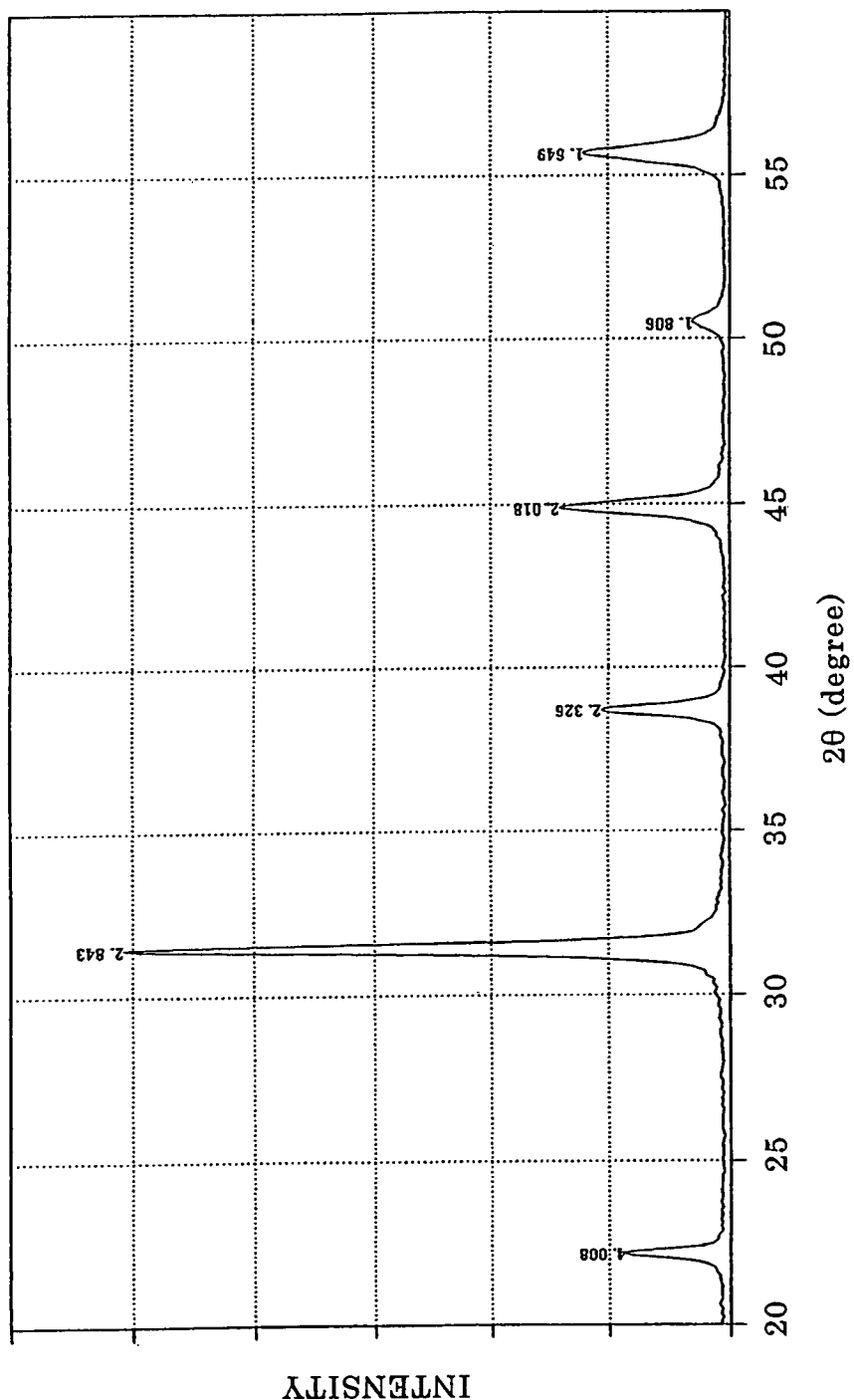
FIG. 8 is an X-ray diffraction pattern of a composition obtained in the second process in Example 13.

It was confirmed by X-ray diffraction that the composition was barium titanate zirconate having a cubic perovskite structure, as shown in FIG. 8. Further, the composition was subjected to electron microscopic measurement to show that it was a spherical particle in shape having an average particle diameter of 0.06 μm, and that the ratio of particles having pores having a nano meter size was 3 per 100 particles. The composition was analyzed by a fluorescent X-ray method to show that the ratio of Ba/(Ti+Zr) was 1.00. Further, the composition was found to have a BET specific surface area of 18 m$^2$/g.

Example 14

200 mL of ion-exchanged water was added to 94.5 g (0.5 mol as titanium) of titanium tetrachloride to prepare an aqueous solution of titanium tetrachloride. The aqueous solution of titanium tetrachloride was added to 283 g of aqueous solution of urea having a concentration of 30% by weight and kept at 80° C. over 1 hour. After the resulting mixture was heated and refluxed for 10 hours, an aqueous solution of ammonia having a concentration of 5% by weight was added to the mixture so that it had a pH of 10, thereby providing a slurry of titanium hydroxide. The titanium hydroxide was washed with water and collected by filtration. Water was added to the titanium hydroxide to prepare a slurry having a concentration of 2.0 mol/L. The slurry was then heated at a temperature of 80° C. for 10 hours with stirring (the first step). The titanium oxide thus obtained was found to have an average particle diameter of 0.02 μm by electron microscopic measurement.

The whole amount of the slurry of titanium oxide was placed in a beaker made of polytetrafluorethylene. 126.2 g of barium hydroxide octahydrate and 26.6 g of strontium hydroxide octahydrate were added to the slurry of titanium oxide under nitrogen atmosphere, and then water thereto so that it had a concentration of 1.0 mol/L (in terms of Ba$_{0.8}$Sr$_{0.2}$TiO$_3$). Then, a composition comprising an ABO$_3$ compound (which is simply referred to as the composition herein this Example) was obtained in the same manner as Example 1.

It was confirmed by X-ray diffraction that the composition was barium strontium titanate having a cubic perovskite structure. Further, the composition was subjected to electron microscopic measurement to show that it was a spherical particle in shape having an average particle diameter of 0.04 μm, and that the ratio of particles having pores having a nano meter size was 4 per 100 particles. The composition was analyzed by a fluorescent X-ray method to show that the ratio of (Ba+Sr)/Ti was 1.00. The composition was found to have a BET specific surface area of 22 m$^2$/g.

Example 15

85.4 g of titanium tetrachloride (0.45 mol as titanium) was added to 1300 mL of ion-exchanged water with stirring while the titanium tetrachloride was kept at a temperature of 50° C. to prepare an aqueous solution of titanium tetrachloride. An aqueous solution of tin tetrachloride (SnCl$_4$) having a concentration of 40% by weight was added to the aqueous solution of titanium tetrachloride to prepare an aqueous mixed solution of titanium tetrachloride and tin tetrachloride. 800 g of aqueous solution of sodium hydroxide having a concentration of 10.0% by weight was added to the aqueous mixed solution of titanium tetrachloride and tin tetrachloride over 30 minutes to prepare a slurry of titanium tin hydroxide coprecipitate.

The titanium tin hydroxide coprecipitate was washed with water and collected by filtration, and water was added to the titanium tin hydroxide coprecipitate to prepare a slurry having a concentration of 1.5 mol/L. The whole amount of the slurry was placed in a beaker made of polytetrafluorethylene, and placed in an autoclave having a 1 L capacity to subject the slurry to a hydrothermal reaction at 150° C. for 5 hours (the first process). The titanium tin oxide thus obtained was found to have an average particle diameter of 0.04 μm by electron microscopic measurement.

315.4 g of barium hydroxide octahydrate and water were added to the slurry of titanium tin oxide under nitrogen atmosphere so that it had a concentration of 1.0 mol/L (in terms of BaTi$_{0.9}$Sn$_{0.1}$O$_3$). Then, a composition comprising an ABO$_3$ compound (which is simply referred to as the composition herein this Example) was obtained in the same manner as Example 2.

It was confirmed by X-ray diffraction that the composition was barium titanate stannate having a cubic perovskite structure. Further, the composition was subjected to electron microscopic measurement to show that it was a spherical particle in shape having an average particle diameter of 0.06

μm, and that the ratio of particles having pores having a nano meter size was 7 per 100 particles. The composition was analyzed by a fluorescent X-ray method to show that the ratio of Ba/(Ti+Sn) was 1.00. The composition was found to have a BET specific surface area of 17 m²/g.

Example 16

A slurry of titanium oxide was prepared using titanium tetrachloride in the same manner as Example 14 (the first process). The whole amount of the titanium oxide was collected by filtration and placed in a beaker made of polytetrafluoroethylene. 149.8 g of barium hydroxide octahydrate, 1.5 g of magnesium hydroxide (Mg(OH)$_2$) and water were added to the slurry of the titanium oxide under nitrogen atmosphere so that it had a concentration of 1.0 mol/L (in terms of Ba$_{0.95}$Mg$_{0.05}$TiO$_3$). Then, the second process was carried out in the same manner as Example 1.

The composition thus obtained in the second process was heated in an electric furnace at 800° C., and then wet pulverized in a pot mill made of nylon using zirconium balls to prepare an ABO$_3$ compound (which is simply referred to as the composition herein this Example).

It was confirmed by X-ray diffraction that the composition was barium magnesium titanate having a perovskite structure. Further, the composition was subjected to electron microscopic measurement to show that it had an average particle diameter of 0.1 μm, and that the ratio of particles having pores having a nano meter size was 8 per 100 particles. The composition was analyzed by a fluorescent X-ray method to show that the ratio of (Ba+Mg)/Ti was 1.00. The composition was found to have a BET specific surface area of 14 m²/g.

Example 17

127.98 g (0.45 mol as titanium) of titanium isopropoxide and 20.74 g (0.05 mol as hafnium) of hafnium isopropoxide were dissolved in 500 mL of isopropyl alcohol and the resulting solution was refluxed for 2 hours under nitrogen atmosphere. 70 mL of ion-exchanged water was added to the resulting solution over 60 minutes with stirring to prepare a slurry of coprecipitate of titanium hafnium hydroxide. The coprecipitate of titanium hafnium hydroxide was washed with water and collected by filtration, and water was added thereto to prepare a slurry having a concentration of 1.5 mol/L. The whole amount of the slurry was placed in a beaker made of polytetrafluoroethylene, and placed in an autoclave having a 1 L capacity to subject the slurry to a hydrothermal reaction at 200° C. for 5 hours with stirring (the first process). The titanium hafnium oxide thus obtained was found to have an average particle diameter of 0.03 μm by electron microscopic measurement.

315.4 g of barium hydroxide octahydrate and water were added to the slurry of titanium hafnium oxide under nitrogen atmosphere so that it had a concentration of 1.0 mol/L (in terms of BaTi$_{0.9}$Hf$_{0.1}$O$_3$). Then, a composition comprising an ABO$_3$ compound (which is simply referred to as the composition herein this Example) was obtained in the same manner as Example 2.

It was confirmed by X-ray diffraction that the composition was barium titanate hafnate having a perovskite structure. Further, the composition was subjected to electron microscopic measurement to show that it was a spherical particle in shape and had an average particle diameter of 0.05 μm, and that the ratio of particles having pores having a nano meter size was 4 per 100 particles. The composition was analyzed by a fluorescent X-ray to show that the ratio of Ba/(Ti+Hf) was 1.00. The composition was found to have a BET specific surface area of 19 m²/g.

Example 18

While keeping at a temperature of 50° C., 75.9 g of titanium tetrachloride (0.4 mol as titanium) was added to 1300 mL of ion-exchanged water with stirring, and then 100 mL of aqueous solution of zirconium oxychloride having a concentration of 178 g/L to prepare an aqueous mixed solution of titanium tetrachloride and zirconium oxychloride. 800 g of aqueous solution of sodium hydroxide having a concentration of 10.0% by weight was added to the aqueous solution of titanium tetrachloride and zirconium oxychloride over 30 minutes to prepare a slurry of coprecipitate of titanium zirconium hydroxide.

The coprecipitate of titanium zirconium hydroxide was washed with water and collected by filtration, and water was added thereto to prepare a slurry having a concentration of 1.5 mol/L. The whole amount of the slurry was placed in a beaker made of polytetrafluoroethylene, and placed in an autoclave having a 1 L capacity to subject the slurry to a hydrothermal reaction at 150° C. for 5 hours with stirring (the first process). The titanium zirconium oxide thus obtained was found to have an average particle diameter of 0.03 μm by electron microscopic measurement.

149.8 g of barium hydroxide octahydrate, 1.9 g of calcium hydroxide (Ca(OH)$_2$) and water were added to the slurry of titanium zirconium oxide under nitrogen atmosphere so that it had a concentration of 1.0 mol/L (in terms of Ba$_{0.95}$Ca$_{0.05}$Ti$_{0.8}$Zr$_{0.2}$O$_3$). Then, the second process was conducted in the same manner as Example 1.

The composition thus obtained in the second process was heated in an electric furnace at 900° C., and then wet pulverized in a pot mill made of nylon using zirconium balls to obtain an ABO$_3$ compound (which is simply referred to as the composition herein this Example).

Figure 9:
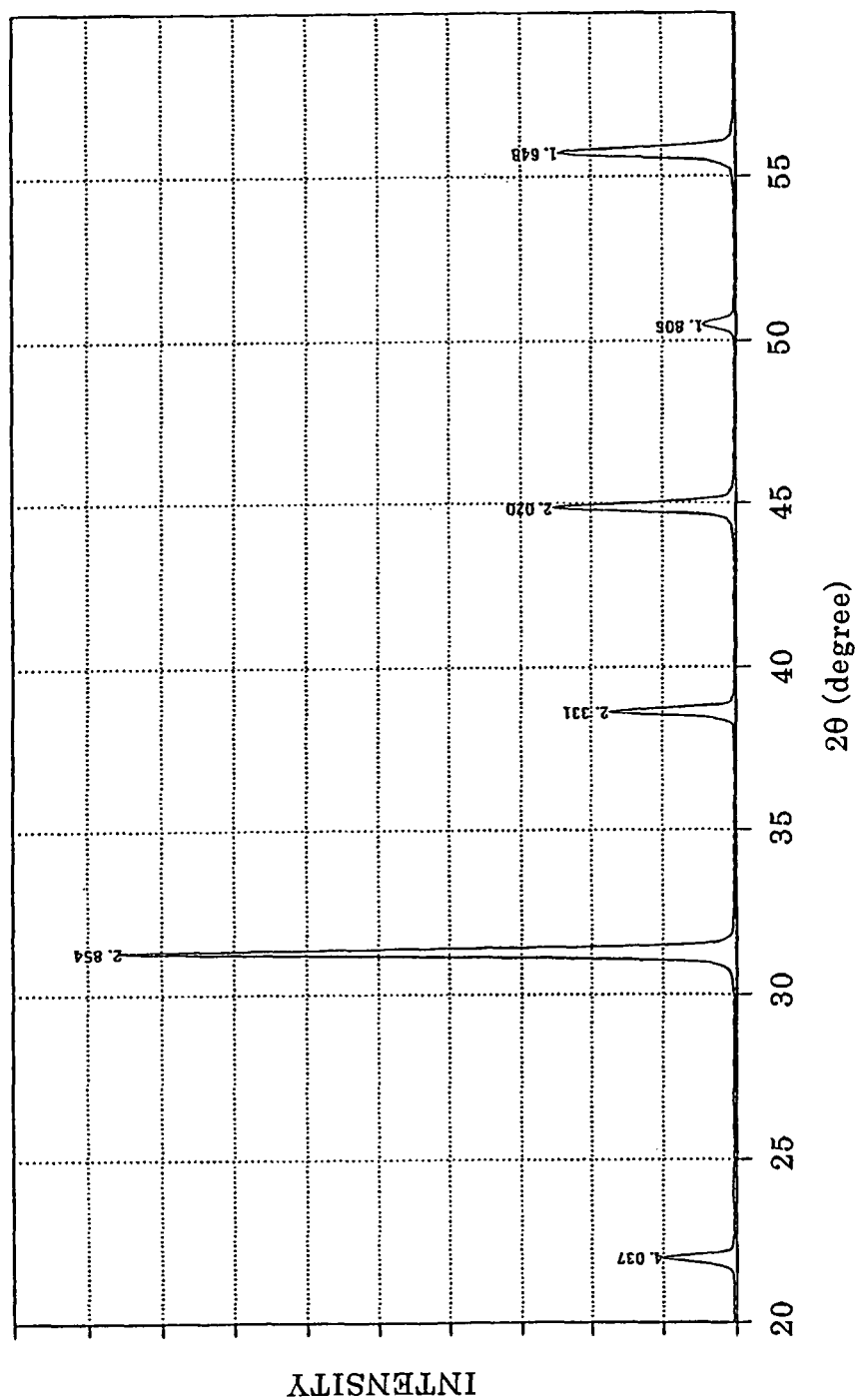
FIG. 9 is an X-ray diffraction pattern of a composition obtained in the second process in Example 18.

It was confirmed by X-ray diffraction that the composition was barium calcium titanate zirconate having a perovskite structure, as shown in FIG. 9. Further, the composition was subjected to electron microscopic measurement to show that it was a spherical particle in shape and had an average particle diameter of 0.2 μm, and that the ratio of particles having pores having a nano meter size was 7 per 100 particles. The composition was analyzed by a fluorescent X-ray method to show that the ratio of (Ba+Ca)/(Ti+Zr) was 1.00. Further, the composition was found to have a BET specific surface area of 7 m²/g.

Comparative Example 1

High purity barium carbonate and high purity titanium oxide were mixed together in an equal molar ratio. The mixture was dried fully and calcined at 1200° C. for 2 hours, The calcined product was wet pulverized in a pot mill made of polyethylene using zirconium balls to prepare a composition comprising an ABO$_3$ compound (which is simply referred to as the composition herein this Example).

It was confirmed by X-ray diffraction that the composition was barium titanate having a tetragonal perovskite structure. The composition was found to have a crystallite diameter of 1200 Å by applying the half value width of (111) face obtained by X-ray diffraction of the composition to the Scherrer's formula. Further, the particles of barium titanate were found to be non-uniformly crushed particles having an average particle diameter of 1.6 μm as a result of electron microscopic observation. The composition was analyzed by a fluorescent X-ray method to show that the ratio of Ba/Ti was 1.00. The composition was found to have a BET specific surface area of 1.2 m$^2$/g.

Comparative Example 2

94.9 g of titanium tetrachloride (0.5 mol as titanium) was added to 1300 mL of ion-exchanged water with stirring while the titanium tetrachloride was kept at a temperature of 50° C. to prepare an aqueous solution of titanium tetrachloride. 800 g of aqueous solution of sodium hydroxide having a concentration of 10.0% by weight was added to the aqueous solution of titanium tetrachloride over 30 minutes to prepare a slurry of titanium hydroxide.

The titanium hydroxide was washed with water and collected by filtration. Without heating the thus obtained titanium hydroxide (that is to say, without the first process), water was added to the titanium hydroxide to prepare a slurry having a concentration of 2.0 mol/L. The whole amount of the slurry was placed in a beaker made of polytetrafluoroethylene, and then 157.7 g of barium hydroxide octahydrate and water were added thereto so that it had a concentration of 1.0 mol/L (in terms of BaTiO$_3$).

The slurry was placed in an autoclave having a 1 L capacity. The slurry was heated up to 150° C. over 90 minutes with stirring at 550 to 600 rpm, and then subjected to a hydrothermal reaction at 150° C. for 5 hours. After the hydrothermal reaction, carbon dioxide gas was blown into the reaction mixture until it had a pH of 6.5, and then the reaction mixture was washed with water until chlorine was no longer detected, followed by collecting the resulting reaction product by filtration and drying at 110° C. to provide a composition comprising an ABO$_3$ compound (which is simply referred to as the composition herein this Comparative Example).

It was confirmed by X-ray diffraction that the composition was barium titanate having a cubic perovskite structure. The composition was analyzed by a fluorescent X-ray method to show that the ratio of Ba/Ti was 1.00. The composition was found to have a BET specific surface area of 13 m$^2$/g. The particles of barium titanate obtained were found to be spherical particle having an average particle diameter of 0.1 μm, however, the ratio of particles having pores having a nano meter size was 32 per 100 particles.

Comparative Example 3

The composition obtained in Comparative Example 2 was calcined in the same manner as Example 7, and then wet pulverized, to provide a composition comprising an ABO$_3$ compound (which is simply referred to as the composition herein this Comparative Example). It was confirmed by X-ray diffraction that the composition was barium titanate having a tetragonal perovskite structure. Further, the composition was subjected to electron microscopic measurement to show that it had an average particle diameter of 0.2 μm, and that the ratio of particles having pores having a nano meter size was 37 per 100 particles.

The invention claimed is:

1. A process for producing a composition comprising a perovskite structure compound, the process comprising:
   a first process to heat (1) a hydroxide of at least one B group element selected from the group consisting of Ti, Zr, Hf, and Sn, at a temperature within a range of 150 to 300° C. in the presence of an aqueous medium and further in the presence of (2) at least one selected from the group consisting of (a) an inorganic acid; and (b) at least one material selected from the group consisting of an organic polybasic carboxylic acid, an organic oxypolybasic carboxylic acid, and an alkali metal salt of the carboxylic acids, so that the hydroxide of (1) is dehydrated to form a corresponding oxide; and
   a second process to heat the oxide obtained in the first process and a hydroxide of at least one A group element selected from the group consisting of Ba, Sr, Ca, Mg, and Pb at a temperature within a range of 100 to 300° C. in the presence of an aqueous medium,
   wherein an average particle size of the perovskite structure compound is 1 μm or smaller, and
   a ratio of particles of the perovskite structure compound having nano meter size ores relative to 100 particles of the perovskite structure compound is ten or less.

2. The process according to claim 1, wherein the process further comprises a third process to heat the composition obtained in the second process at a temperature within a range of 800 to 1200° C.

3. The process according to claim 1, wherein the inorganic acid is nitric acid or hydrochloric acid.

4. The process according to claim 1, wherein the oxide obtained in the first process and a hydroxide of at least one A group element selected from the group consisting of Ba, Sr, Ca, Mg, and Pb are heated at a temperature within a range of 150° to 300° C. in the presence of an aqueous medium in the second process.

5. The process according to claim 1, wherein at least one compound of an element selected from the group consisting of boron, Bi, an alkali metal, a rare earth element, a transitional metal, Si, and Al is present in the first process or the second process or after completing the second process.

6. The process according to claim 1, wherein the particles of the perovskite structure compound have an average particle size in a range from 0.01 μm to 0.5 μm.

* * * * *